United States Patent
Jablonski

[11] Patent Number: 6,110,418
[45] Date of Patent: Aug. 29, 2000

[54] METHOD OF MANUFACTURING WEAR RESISTANT CUTTING KNIVES AND GRANULATOR KNIFE PRODUCED THEREBY

[76] Inventor: David A. Jablonski, 2 Danecca Dr., Whitman, Mass. 02382

[21] Appl. No.: 09/188,443

[22] Filed: Nov. 9, 1998

[51] Int. Cl.⁷ .................................. B22F 3/12; B22F 7/04
[52] U.S. Cl. .................................. 419/8; 419/28; 419/29; 419/49
[58] Field of Search .................. 419/8, 28, 29, 419/49

[56] References Cited

U.S. PATENT DOCUMENTS

| | | | |
|---|---|---|---|
| 5,722,306 | 3/1998 | Vela et al. | 76/101.1 |
| 5,815,790 | 9/1998 | Billgren et al. | 419/5 |

*Primary Examiner*—Daniel J. Jenkins
*Attorney, Agent, or Firm*—John R. Benefiel

[57] ABSTRACT

A method for manufacturing cutting knives, in particular granulator knives in which a mass of highly wear resistant material is bonded along one edge of a main body of a tougher, more ductile material, the cutting edge machined into the mass of wear resistant material, to increase the service life of the knife between sharpenings without subjecting the tool to breakage during heavy use in a granulator.

8 Claims, 2 Drawing Sheets

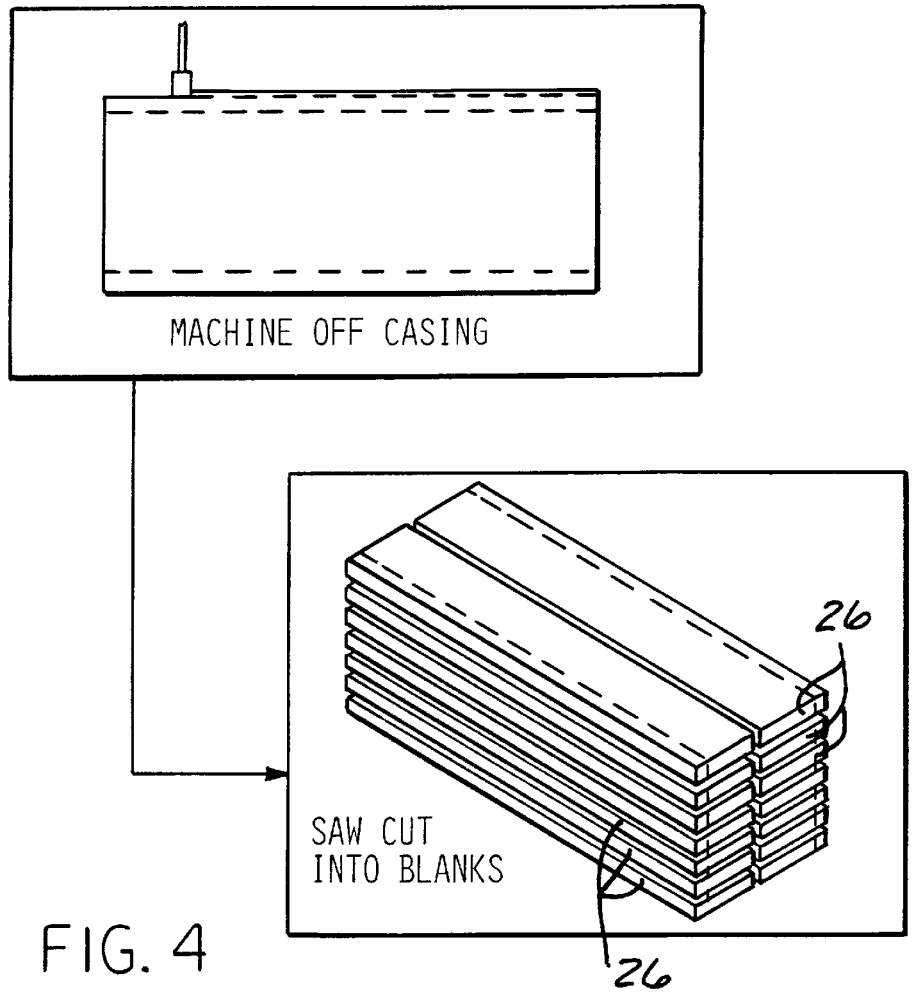
FIG. 4
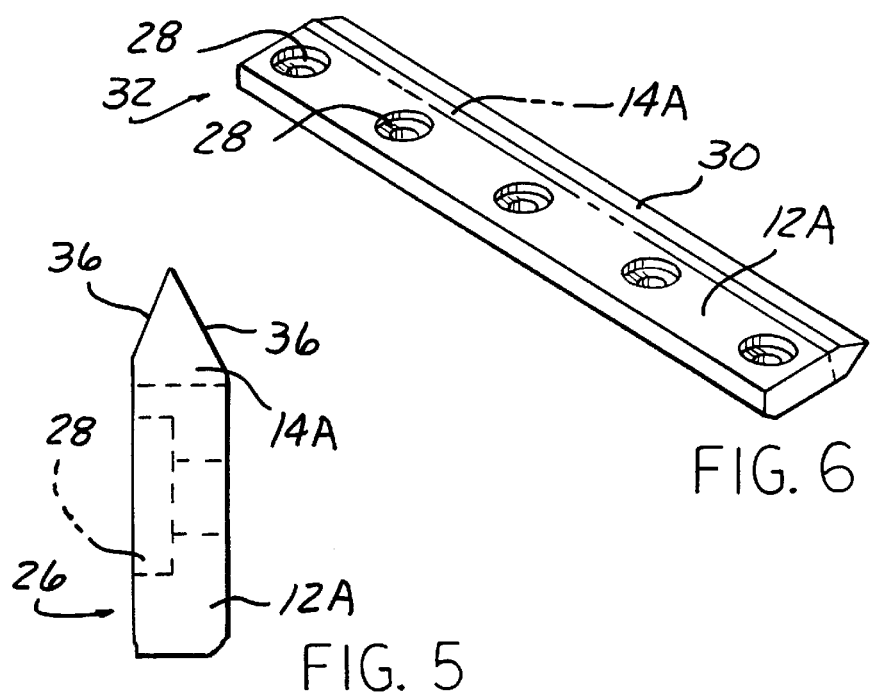
FIG. 5
FIG. 6

METHOD OF MANUFACTURING WEAR RESISTANT CUTTING KNIVES AND GRANULATOR KNIFE PRODUCED THEREBY

BACKGROUND OF THE INVENTION

This invention concerns cutting tools and more particularly knives for granulators, which are used to cut up plastic scrap into granules for use in recycling the plastic.

Granulators use elongated cutting knives mounted with bolts to a rotating cylinder, and a fixed bed knife past which the rotating knives cuts.

Large forces are generated such that the cutter knives must be rugged enough to be able to withstand high impact loads without cracking around the mounting holes. At the same time, because it is difficult to change knives, the wear resistance of the cutting edge is very important to reduce the downtime required to replace or resharpen the knives.

These requirements are somewhat at odds with each other, in that very hard, wear resistant alloys tend to be less ductile and more brittle, and thus less able to resist high peak loadings encountered so that breakage and cracking would be likely if a highly wear resistant material was used for the entire knife. Thus, a compromise in materials has heretofore been necessary, such that the wear resistant qualities of these knives is not optimal, and they must often be replaced or removed and resharpened.

It is the object of the present invention to provide a method of manufacturing cutting knives and more particularly granulator knives which method is economical and yet provides greatly improved wear resistance without increasing vulnerability of these knives to breakage and cracking.

SUMMARY OF THE INVENTION

The above object and others which will become apparent upon a reading of the following claims are achieved by a method for producing composite cutting knives each having a hard wear resistant cutting edge and a main body of a tougher, more ductile material.

The method includes the steps of enclosing a rectangular block of alloy steel such as H13 high speed tool steel in a mild steel casing which is sized to create spaces on opposing sides of the block. These spaces are filled with a tool steel powder such as CPM 10V or CPM 15V prior to sealing of the casing.

These materials have closely matched phase change expansion and contraction characteristics as well as thermal expansion coefficients, so as to minimize warpage and residual stress resulting from heat treating. After sealing the casing, a vacuum is applied to the spaces via suitable fittings prior to placement in a hot isostatic pressing (HIP) high pressure furnace chamber. An inert gas such as argon is introduced into the chamber under high pressure, the casing also heated to a high temperature. The casing is thereby collapsed compressing the heated powdered alloy material which is fused into solid masses on either side of the high speed tool steel block, and at the same time these masses are diffusion bonded to the steel block.

After removal from the furnace and cooling. The composite block is annealed, the casing is machined off and then saw cut into a plurality of flat bars each having a mass of wear resistant material bonded on one side, these bars comprising knife blanks.

The knife blanks are then rough machined into a granulator knife configuration, with a series of mounting holes machined into the high strength, ductile body of high speed tool steel, and a cutting edge machined into the mass of wear resistant material bonded to one side.

The rough machined knives are then heat treated to be hardened, and then each finish machined by grinding to produce the final form of a granulator knife.

The knives are produced economically by this method, but exhibit greatly increased wear resistance of the cutting edge, while having a main body portion which is able to withstand the high impact forces involved without cracking.

DESCRIPTION OF THE DRAWINGS

FIG. 4 is a block diagram of the cutting steps used to produce knife blanks from the composite block.

FIG. 5 is an enlarged side view of a composite granulator knife according to the invention.

FIG. 6 is a perspective view of the granulator knife according to the invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 2:
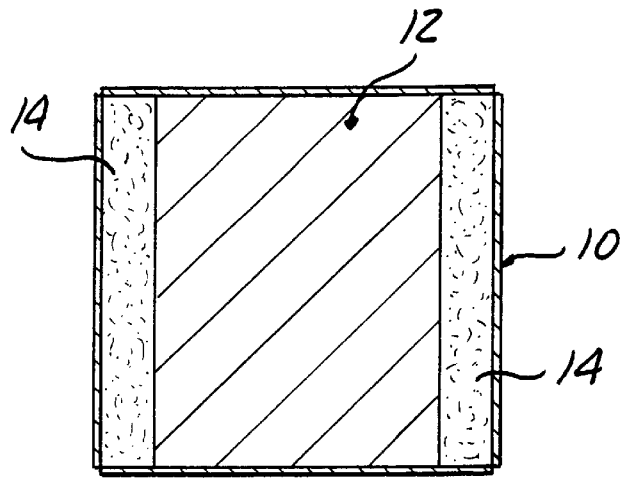
FIG. 2 is a transverse sectional view of the casing shown in FIG. 1.
Figure 1:
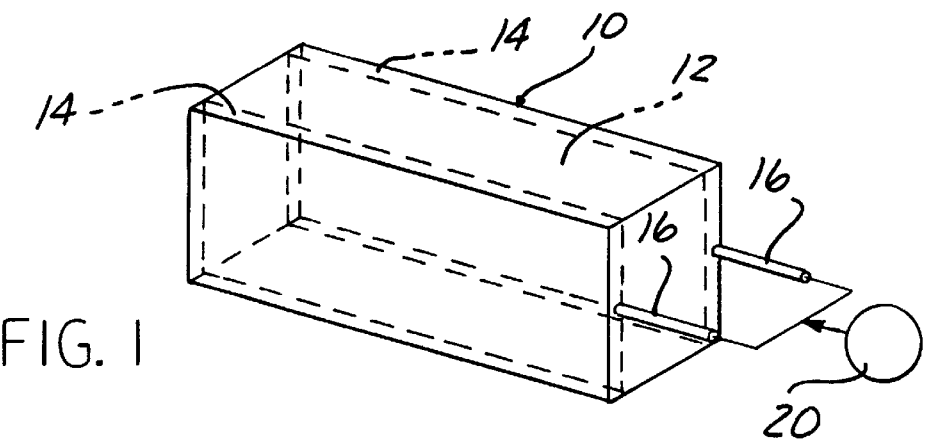
FIG. 1 is a perspective view of a casing enclosing a block of high speed tool steel and confining volumes of tool steel powder adjacent opposite sides of the block, with tubes attached connecting with the cavities containing tool steel powder.

Referring to the drawings, as a first step, a mild steel casing 10 is fabricated of a width corresponding to twice the height of the granulator knives to be produced. A block 12 of high speed tool steel such as H13, of a width equal to twice the height of a body portion of the knives, and a length equal to the length of the knives to be formed ,is enclosed in the casing 10 so as to provide spaces allowing volumes of tool steel powder 14 to each be respectively placed along adjacent opposite sides of the block 12. As seen in FIG. 2, the spaces occupy the entire width of the block 12.

The tool steel alloy powder selected should be of a highly wear resistant material, but having a characteristic expansion during heat treatment induced phase changes closely matched to the material used for the block 12, as well as the same approximate coefficient of thermal expansion to avoid warpage and residual stress build up of the blanks to be formed. When using H13 steel, CPM 10V arid 15V have been found to satisfactorily perform in these respects.

Such tool steels are manufactured and provided to users in powder form as this promotes uniformity of the material composition and facilitates the addition of alloying materials.

A vacuum source 20 is able to be connected to the interior of the casing via tube fittings 16 welded to one end of the casing 10 in order to remove air or to provide inert environment for the compaction and diffusion bonding of the powder to the block 12.

Figure 3:
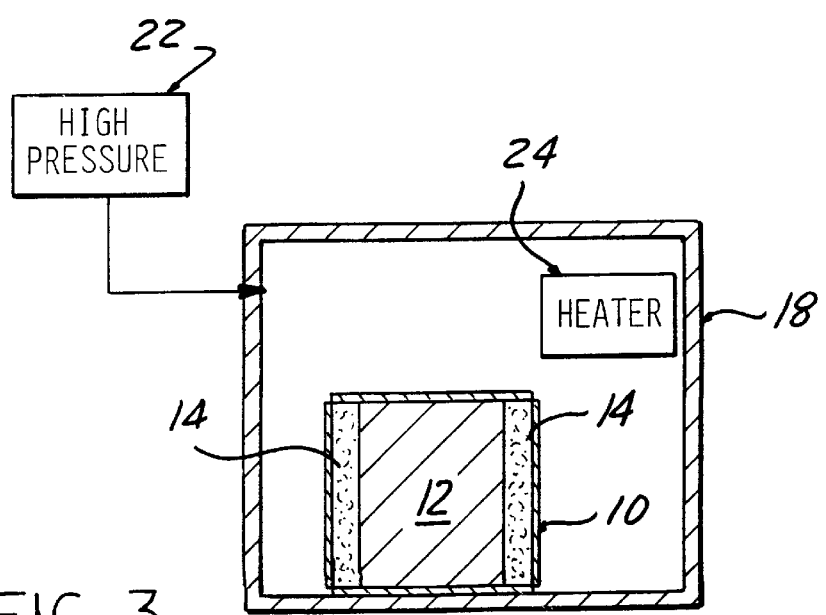
FIG. 3 is a diagrammatic representation showing processing of the casing in a high isostatic pressure furnace chamber.

FIG. 3 represents the HIP process to which the casing with the enclosed block 12 and tool steel powder 14 is subjected in a high pressure furnace 18.

High pressure (15000 psi) inert gas, such as argon is introduced from a source 22 while heating to a high temperature (2165° F.) takes place by operation of a heater 24.

Such apparatus is commercially available as from ASEA of Sweden, as the HIP process is well known as a process to manufacture tools from powder alloys. The details of such apparatus and process are thus not here set forth.

The casing 10 is thereby tightly compressed to create a high degree of compaction of the volumes of alloy powder 14 which is formed into a solid mass, and at the same time diffusion bonding of that material to the block 12 takes place.

After removal from the furnace 18 and cooling the composite block is then annealed, and the casing 10 is machined off (FIG. 4), in preparation to being sawed lengthwise into two slabs, and then sawed into a plurality of flat bars, each corresponding to individual knife blanks 26, as seen in FIG. 4.

Each knife blank 26 comprises an elongated bar, having one side comprised of the bonded mass 14A of wear resistant tool steel material, indicated by a phantom line, and the man body portion 12A cut from steel block 12.

The knife blanks 26 are then rough machined into a basic granulator knife configuration, with a series of mounting holes 28 distributed along the length of the main body portion 12A and the beveled edges 36 machined into the wear resistant mass 14A (FIGS. 5 and 6).

The rough machined blank 26 is then heat treated to be hardened, and final machining by grinding is carried out to complete the tool comprised of the granulator knife 32.

The wear resistance of the cutting edges of granulator knives 32 manufactured by the above method has been found to greatly exceed conventionally constructed granulator knives, and yet these knives are very durable and resistant to cracking failure of the main body portion.

What is claimed is:

1. A method of manufacturing cutting knives, comprising the steps of:

enclosing a rectangular block of steel in a surrounding casing with a space defined between said casing and each of two opposite sides of said block said space extending across the entire width of said block;

disposing a volume of powder alloy in each space within said casing block;

compressing said casing while heating the same so as to cause each of said powder alloy volumes to be formed in a solid portion diffusion bonded to a respective side of said steel block forming a composite block;

annealing said composite block;

removing said casing;

forming a plurality of knife blanks from said composite block by cutting said composite block lengthwise into a series of knife blanks each extending the length of said composite block, each knife blank having a main body portion comprised of said steel block material and a cutting edge portion comprised of said compressed powder alloy material extending along one side edge of said main body portion;

rough machining said knife blanks into a basic cutting knife configuration;

heat treating said rough machined knives to harden the same; and, finish machining said knives.

2. The method according to claim 1 including the step of selecting the material of said steel block and said powder alloy to have approximately matching characteristic volume changes during phase changes of said respective materials occurring during heat treatment as well as coefficients of thermal expansion to avoid warpage and residual stress build up.

3. The method according to claim 2 wherein CPM 10V is used for the powder alloy.

4. The method according to claim 2 wherein CPM 15V is used for the powder alloy.

5. The method according to claim 3 wherein H13 high speed tool steel is used in said steel block.

6. The method according to claim 4 wherein H13 high speed tool steel is used in said steel block.

7. The method according to claim 1 wherein a series of mounting holes are machined into said main body portion of each cutting knife blank said mounting holes distributed along the length of said main body portion.

8. The method according to claim 7 wherein angled surfaces are machined on said cutting edge portion, extending along the length of said cutting knife blank.

* * * * *